J. E. THORNTON.
FILM FOR USE IN COLOR CINEMATOGRAPHY.
APPLICATION FILED APR. 10, 1913.

1,250,713.  Patented Dec. 18, 1917.

Inventor
John E. Thornton

UNITED STATES PATENT OFFICE.

JOHN EDWARD THORNTON, OF ROCHESTER, NEW YORK, ASSIGNOR TO JOHN OWDEN O'BRIEN, OF MANCHESTER, ENGLAND.

FILM FOR USE IN COLOR CINEMATOGRAPHY.

1,250,713.  Specification of Letters Patent.  Patented Dec. 18, 1917.

Application filed April 10, 1913. Serial No. 760,200.

*To all whom it may concern:*

Be it known that I, JOHN EDWARD THORNTON, a British subject, residing at Rochester, N. Y., United States of America, have invented certain new and useful Improvements in Films for Use in Color Cinematography, of which the following is a specification.

This invention relates to the means of producing cinematograph or motion pictures in natural colors, whereby each color picture is complete in itself on a single film strip, just the same as regular monochrome pictures, and can therefore be shown in the standard types of projectors now used for black and white pictures, without any alteration to the apparatus.

This is attained by first splitting up the picture, at the time of first photographing it, into two negatives for a 2-color picture, and likewise three or four for a 3 or 4-color picture. There are several known methods, cameras, and optical appliances for making such negatives, so that no explanation is needed here. They are made through color filters, by which each negative is therefore caused to represent only a section of the object photographed. For instance, a 2-color picture consists of two negatives, one exposed through a green and the other through a red filter. When making positives from such negatives, the red positive is printed from the negative that was exposed through the green filter, and vice versa. When two such colored positives—a red and a green—are superimposed, such as by printing them in the way described in this specification, they form a complete picture in colors. True it will be only two colors, but by suitable overlapping of the two images in parts the effect of other colors is produced, so that the combined effect is a picture in a sufficiently wide range of tones or shades of color to produce to the eye the effect of three or more colors. This result is all the better attained if the two colors are not exactly complementary, being instead slightly unbalanced, such as orange-red, instead of red, and bluish green, instead of green.

Its advantage over previous inventions is that it uses only one half the amount of film stock; that is to say, it uses the same amount of stock as an ordinary monochrome film, instead of double the amount as is the case in all systems utilizing alternating color-section pictures.

Figure 1:
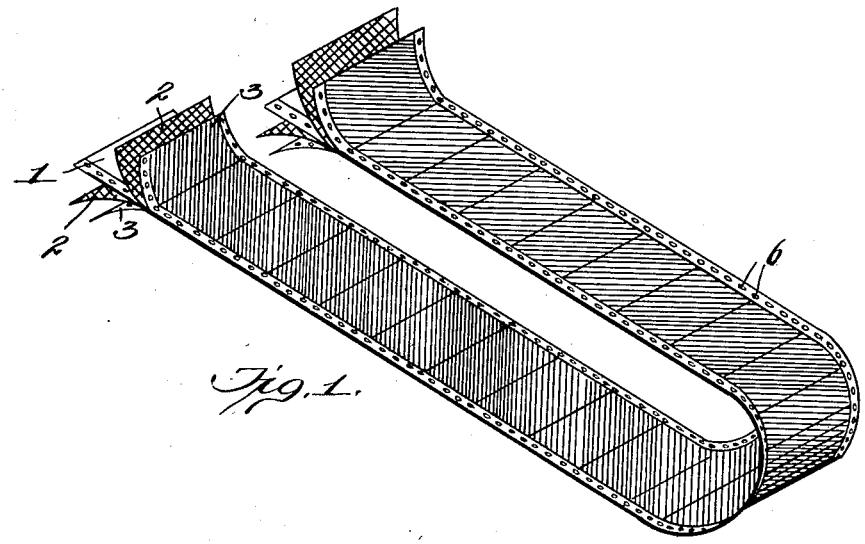
Figure 2:
Figure 3:
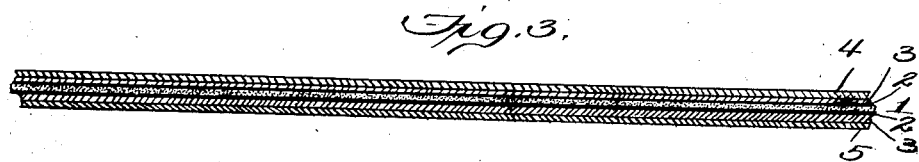

The accompanying drawing illustrates color films made in accordance with the present invention, Figure 1 being a perspective view of a cinematographic color film embodying the invention;

Fig. 2 representing a longitudinal section, enlarged, of the film shown in Fig. 1; and Fig. 3 representing a longitudinal section of a 4-color film embodying the invention.

In carrying out the invention in its simplest form of manufacture for an ordinary two-color picture film, I use a film base or stock 1 of the standard description as generally used for silver monochrome films. This may be celluloid, cellulose acetate, or other suitable transparent material of about $\frac{5}{1000}$ inch thick.

This is first coated on both sides with a substratum of the kind generally used for causing subsequent coatings to adhere to the base.

It is next coated on both sides with a thin layer 2 of gelatin or other suitable colloid, containing a light-obstructing medium (such as a soluble dye or pigment) capable of being removed by water or chemicals at some later stage of the process, for instance, during the operations of development, fixing, or washing, leaving the gelatin layer transparent.

If desired, the removable light-obstructing medium may be incorporated with the before-mentioned substratum, thus dispensing with the special layer of colloid.

The next stage is to sensitize the film by applying a sensitive coating 3 to both sides, upon the aforesaid coatings.

The result is a combination film, consisting of a central base 1 of transparent celluloid support or its equivalent, and two sensitive surfaces 3 (one on the back and the other on the front), and separated by either one or two removable light-obstructing dyes or mediums 2 which permit both sensitive layers to be printed, either separately or simultaneously, without one being damaged by exposure of the other, thus insuring two independent and clear prints.

Each sensitive side is then printed from a negative of different color value, the two corresponding negatives forming the two sectional pictures of a complete natural color picture record. Each sectional picture of the printed positive will be when finished of a different color—such for instance as bluish-green and red—so that when viewed by transmitted light the combined sectional pictures appear as one complete picture in colors (the opaque light-obstructing layer 2 having been dissolved out).

The two negatives required for printing from are obtained side by side in a camera having two lenses adjustable for parallax.

The film is of course formed with marginal perforations 6, as usual in cinematograph films, and the process described enables color picture films of unlimited length to be produced with great rapidity, as a continuous manufacturing process, at comparatively low cost.

It has been commercially proved that pictures formed in two colors only (though not giving such a perfect rendering of nature's color scale as three) is a fairly satisfactory compromise capable of satisfying the public. Two-color pictures have hitherto been produced by (1) alternate projection of two section pictures in black printed alternately on the face of a single strip, and projected through two differently colored screens; or (2) by superposition on the screen of two separate but simultaneously projected section pictures in black through two differently colored screens. Both systems required double the amount of film necessary for ordinary monochrome pictures; and the "alternating" system also required double the speed for projection, together with an increased amount of light for the purpose. But the system forming the subject of this invention has none of those faults and overcomes all those objections.

Although I prefer to use the standard thickness of film stock $\frac{5}{1000}$ inch, I may, if desired, use much thinner stock, say $\frac{2}{1000}$ or $\frac{3}{1000}$ inch, which would have the advantage of decreasing the separation distance of the two section pictures. The decreased strength of such a thinner film can then be increased and brought up to standard strength and thickness by applying to both sides an outer layer of either a cellulose (such as celluloid cellulose acetate, or the like), or a colloid (such as gelatin, agar agar, or the like). These substances are preferably applied as solutions and then dried, thus inclosing the two printed film surfaces between two protective outer layers.

Accurate registration of the component parts of the same picture during printing is effected by registration pins, teeth, or sprockets, which engage with identical perforations in the film to be printed and in the negative used for such printing.

This invention therefore refers to the construction of the picture film with its composite image. I make no special claim to any particular method or system for sensitizing, printing, or treating such film in order to produce the picture thereon. Several suitable processes have formed the subject of patent applications recently filed by me. But the following, among others, are examples of what may be used:—colored silver images, images having colors substituted for the silver, silver images afterward toned or changed in color, dyed chromate images, pigment images such as powder, soluble color, or carbon (so-called), and others. One of the simplest and most suitable processes for this combination film is that known as the imbibition process, in which the dye is transferred from a bichromated-silver gelatin relief to soft absorbent gelatin on the final print. Two such dyed reliefs are used, and both transferred to the film at same time. The Woodbury type and collotype processes are also suitable.

By a further step in this invention a three-color picture film can be formed by printing one section picture on one side, and two section pictures on the other side of the film. In this case the first two pictures 2 would be printed in the manner already described, and the third picture obtained by re-sensitizing the film on one side after (as at 4 or 5 Fig. 3) printing, developing and drying, and then printing from a third negative on that side to give a superimposed or double printing.

Similarly a four-color picture film can be formed by printing two superimposed section pictures 4 and 5 Fig. 3 on both sides.

It will be understood that the light-obstructing medium 2 is used only for the first two prints and is not required for the superimposed prints since the finished image below is no longer sensitive.

All the above references to sensitive layers, light-obstructing layers, developing, and so on apply only if the particular printing process selected is one that uses sensitive film requiring to be printed by light and developed afterward.

But, as already hereinbefore mentioned, this duplex type of color film may be printed by other processes, that do not require sensitive film, light, or development, but are of a mechanical rather than chemical nature. The imbibition, collotype, and Woodbury type processes are examples.

By producing a positive film on this system there are many advantages, over the only other two-color system now in vogue, known as cinemacolor; for instance: (1) My improved system uses only half the amount of film stock, or the same amount as an ordinary non-color film, instead of double the quantity, as used by cinemacolor; (2) the improved film can be used in any ordinary projecting lantern, same as non-color film, and does not require one of special construction, nor the rotating color screens, such as necessary for cinemacolor; (3) the projected pictures obtained from the improved film are more brilliant because, owing to the positive images being printed in transparent colors, and used without screens instead of black images plus screens, a much larger amount of light passes through, thus giving better illumination from same light consumption and (4) the flicker and eye strain caused by the alternate substitution of red and green images, with consequent intermittent and rapid adjustment of the observer's eyes, are avoided entirely, for the reason that, as the red and green images are both superimposed in the film itself, they are both projected at the same moment, as a complete picture; and one picture is like another inasmuch that it is composed of the two colors combined instead of two alternately substituted colors.

What I claim as my invention and desire to protect by Letters Patent is:—

1. A multi-color single width continuous film for cinematograph pictures comprising a transparent base, a layer of exposed emulsion on each side of the base, the layer on one side containing a finished section of the picture represented by one color, and the layer on the other side containing a finished section of the picture represented by another color, both sections being of such a color as to produce a complete picture in natural colors, substantially as described.

2. A multi-color single width continuous film for cinematograph pictures comprising a transparent base, a layer of exposed emulsion on one side of the base, a plurality of layers of sensitized and exposed emulsion on the other side of the base, that on one side containing a finished section of the picture represented by a single color, and those on the other side containing, respectively, finished sections of the picture in other colors, such sections being of such a color as to produce a complete picture in natural colors, substantially as described.

3. A multi-color single width continuous film for cinematograph pictures comprising a transparent base provided with perforations along its edges, a plurality of layers of exposed emulsion on both sides of the base, each layer containing a finished section of the picture represented by a single color, such sections being of such a color as to produce a complete picture in natural colors, substantially as described.

In testimony whereof I have hereunto set my hand in presence of two subscribing witnesses.

JOHN EDWARD THORNTON.

Witnesses:
   O. J. WORTH,
   W. E. ROGERS.